3,245,803
PEANUT BUTTER STABILIZER SUSPENSION

Joseph S. Baker, Green Township, and Donovan Francis Dasher, Colerain Township, Ohio, and Harsch C. Ince, Glenolden, Pa., assignors to The Procter & Gamble Company, Cincinnati, Ohio, a corporation of Ohio
No Drawing. Filed Nov. 6, 1963, Ser. No. 321,677
14 Claims. (Cl. 99—128)

This invention relates to peanut butter stabilizers suitable for preventing the separation of oils in peanut butter and, more particularly, to peanut butter stabilizer suspensions having a fluid consistency over the normal range of temperatures encountered; namely, about 60° F. to 100° F.

Peanut butter stabilizers consisting of normally solid glycerides suspended in a liquid glyceride vehicle are customarily used in the manufacture of peanut butter to prevent the oil in the peanut butter from separating from the remainder of the constituents after the product has been packed. The added solid glycerides constitute about 1.5% to about 3.0% of the final peanut butter product. These solid glycerides form a network of interlacing crystals in the peanut butter and thus prevent separation of the peanut butter into two distinct oil and solids layers.

Peanut butter stabilizers are generally added in the peanut butter manufacturing process at the peanut grinding stage. In the conventional method for manufacturing peanut butter, the grinding stage follows roasting, blanching and cleaning of the peanuts. The normally solid glycerides are added to the ground peanuts in the form of a suspension in a liquid glyceride vehicle primarly for convenience in handling. In some instances, the solid glycerides are added directly to the ground peanuts in powdered form.

Vegetable oil is the liquid glyceride vehicle normally used in peanut butter stabilizers. When vegetable oil is used as a vehicle, the normally solid glycerides must be in and remain in a beta crystalline phase in order for the stabilizer to remain in a fluid state. The necessity for the solid glycerides to be in a stable beta crystalline phase or be capable of being converted to a beta crystalline phase is explained in U.S. Patent 2,521,242, issued September 5, 1950, to P. J. Mitchell, Jr.

Certain solid glycerides such as substantially completely hydrogenated cottonseed oil and substantially completely hydrogenated rapeseed oil are normally in the beta-prime crystalline phase and cannot be easily converted to the beta crystalline phase. It is preferred to use these solid beta-prime crystalline phase glycerides as stabilizers for peanut butters since they have a greater stabilizing effect than an equivalent amount of beta crystalline phase glycerides. Beta-prime crystalline phase glycerides also improve the resistance of the peanut butter to produce quality change due to variations in processing conditions as explained in Sanders U.S. Patent 3,129,102, granted April 14, 1964. Although it is possible to form a fluid suspension of beta-prime crystalline phase glycerides in vegetable oils, such suspensions are not suitable for use as peanut butter stabilizers since they tend to set to a firm solid mass in a very brief period of time. Surprisingly and unexpectedly, it has now been found that peanut butter stabilizers containing beta-prime crystalline phase glycerides and having a fluid consistency can be prepared by using a vehicle other than vegetable oil; namely, a vehicle consisting of an aqueous polyhydric alcohol solution.

Solid glycerides are not soluble in aqueous polyhydric alcohol solutions; therefore, the solid glycerides are available to stabilize the peanut butter against oil-solids separation.

Although it might be possible to use water as a stabilizer vehicle, too much water in peanut butter tends to cause undesirable "browning" in the finished peanut butter product. "Browning" is a term used to describe the phenomenon that occurs when a high moisture content allows undesirable reactions to proceed between the protein and other constituents of the peanut butter resulting in a darkening of the butter and a destruction of the flavor of the butter. Thus, a suitable vehicle must have a water vapor pressure low enough so as not to cause undesirable "browning" in the finished peanut butter product. The aqueous polyhydric alcohol solutions utilized in the present invention meet this criteria.

It also important that a peanut butter stabilizer suspension be substantially stable against separation of components for at least four hours in order to facilitate the handling of the stabilizer during its normal period of use in the peanut butter manufacturing process. This four hour period of stability will generally eliminate the need for stirring the stabilizer during use. The peanut butter stabilizer suspensions of this invention are substantially stable for at least four hours.

Using a vehicle, such as the polyhydric alcohol solutions of this invention, which is itself a sweetener, eliminates the customary practice of metering sugar into the stabilizer or adding it at the peanut grinding stage as a separate ingredient.

It is, therefore, an object of the present invention to provide a peanut butter stabilizer having a fluid consistency over the normal range of temperatures encountered and containing glycerides in the beta-prime crystalline form.

It is a further object of this invention to provide a peanut butter stabilizer which is substantially stable against separation of components for at least four hours, and which therefore, does not need to be stirred during the ordinary course of the peanut butter manufacturing process.

It is a further object of this invention to provide a peanut butter stabilizer such that when the stabilizer is added to the peanut butter, undesirable "browning" will not occur in the finished butter product.

It is a still further object of this invention to provide a peanut butter stabilizer in which the vehicle is a sweetening agent, thus eliminating the separate metering into the peanut butter of sugar as a separate ingredient.

In addition, it is an object of this invention to provide a peanut butter stabilizer slurry which improves the texture and quality of the finished peanut butter product.

Other objects of the present invention will be apparent from the description of the invention which follows.

It has been found that a peanut butter stabilizer can be made using certain aqueous polyhydric alcohol solutions as a vehicle together with finely divided, high melting, normally solid glycerides in the beta-prime crystalline phase. Certain emulsifiers and gelling agents are optional ingredients which can be used to make the suspension more stable against separation of components.

The stabilizer comprises from about 40% to about 55% by weight of the stabilizer of a liquid vehicle and from about 45% to about 60% by weight of the stabilizer of solids; namely, salt, sugar and solid glycerides. The solids are uniformly distributed in the liquid vehicle. If the percentage of total solids is higher or percentage of liquid vehicle lower the suspension will not be of fluid consistency. If the percentage of solids are lower or the percentage of liquid vehicle higher, the amount of gelling agent and emulsifier that would have to be added to insure stability of the stabilizer suspension for the required four hour period of use would be undesirably high.

Aqueous polyhydric alcohol solutions which are suitable vehicles include aqueous solutions of invert sugar, corn syrup, sucrose, glycerine, honey and sorbitol.

Invert sugar is a mixture of glucose and fructose in equal amounts. The concentration of invert sugar in aqueous solution is generally expressed in degrees Brix. Degrees Brix indicates approximately percentage of dissolved invert sugar. The term "corn syrup" is used herein to define a heterogeneous polysaccharide solution derived from corn and is intended to include the many manufactured embodiments.

The minimum concentration of polyhydric alcohol in the vehicle is defined by a water vapor pressure of not greater than about 20 mm. mercury at 80° F. and preferably not greater than about 12 mm. mercury at 80° F. The minimum concentration of polyhydric alcohol in the vehicle is further defined by a Brookfield viscosity (at 5 r.p.m. and with spindle 3) of about 50 centipoises at 71° F. The upper concentration of polyhydric alcohol in the vehicle is defined by a Brookfield viscosity (at 5 r.p.m. and with spindle 3) of about 1000 centipoises at 71° F. As used hereafter viscosity is a Brookfield viscosity at 5 r.p.m. with spindle 3. The preferred polyhydric alcohol solution has a viscosity of about 500 centipoises at 71° F.

A vehicle composed of an aqueous invert sugar solution is preferred. The preferred concentartion of invert sugar in the vehicle is about 73° Brix; the viscosity of the aqueous invert sugar solution at this concentration is about 500 centipoises at 71° F.

If the water vapor pressure is greater than that specified above, that is, greater than about 20 mm. mercury at 80° F., undesirable "browning" is likely to occur in the finished peanut butter product. If the viscosity of the polyhydric alcohol solution is less than about 50 centipoises at 71° F., many stabilizer suspensions formed will not be substantially stable against separation of components for the required four hour period. If the viscosity of the polyhydric alcohol solution is more than about 1000 centipoises at 71° F., the stabilizer tends to lose its fluid characteristics.

Besides providing a vehicle for solids the aqueous polyhydric alcohol solution has the additional advantage of being a sweetener, thus eliminating the need for the addition of any other sweetener such as sugar or substantially reducing the amount of other sweetener that is added to the peanut butter.

Finely divided, high melting normally solid glycerides in the beta-prime crystalline phase comprise from about 20% to about 60% of the weight of the stabilizer. The 20% minimum of solid glycerides is essential; otherwise, there is not enough stabilizer present to stabilize the peanut butter unless an excessive amount of the stabilizer is added. Optional solid ingredients include finely divided salt, finely divided sugar; and finely divided, high melting normally solid glycerides in the beta crystalline phase to supplement stability provided by the solid glycerides in the beta-prime crystalline phase.

Finely divided, high melting, normally solid glycerides that are normally in the beta-prime crystalline phase and within the scope of the present invention include substantially completely hydrogenated rapeseed oil, cottonseed oil, palm oil and tallow. Substantially completely hydrogenated peanut oil can easily be converted to the beta-prime crystalline phase and when so converted is within the scope of the present invention. Preferred glycerides are rapeseed oil and cottonseed oil, hydrogenated to an iodine value not greater than about 10.

Gelling agents and emulsifiers can be used to make the stabilizer suspension substantially stable against separation of components for at least four hours and for a period of time substantially in excess of four hours. The addition to the stabilizer of from about 0.1% to about 0.5% by weight of the stabilizer of a hydrophilic colloid and from about 0.05% to about 0.5% by weight of the stabilizer of an emulsifier selected from the group consisting of lecithin, polyoxyethylene sorbitan monostearate and polyoxyethylene sorbitan monolaurate insures substantial stability against separation of components for at least four hours or more after the suspension is formed and generally eliminates the need for stirring the slurry before use. The addition to a stabilizer including the preferred aqueous invert sugar vehicle of a hydrophilic colloid and emulsifier in the above ranges makes the stabilizer suspension substantially stable against separation of components for an indefinite period of time; such a suspension will be substantially stable even after six months.

The preferred hydrophilic colloid is rapid set pectin (150 grade). Rapid set refers to the quality of the pectin to thicken rapidly at an optimum pH. Rapid set is distinguished from medium set and slow set pectins; the rapid setting in less than 10 minutes, the medium setting in 10 to 25 minutes and the slow setting in more than 25 minutes. A rapid set pectin has a degree of methoxylation of 70% or higher. Rapid set pectin (150 grade) has a methoxyl content of 9% to 11.5% on a moisture and ash free basis. The 150 grade indicates that one weight unit of the pectin and 150 weight units of sucrose will make a jelly of standard firmness at 65% soluble solids content when only pectin, sugar, water, and acid are used. The pH may have to be adjusted to about 3.8 with a weak organic acid as citric acid to activate the pectin. No pH adjustment is necessary in the case of the preferred aqueous invert sugar vehicle since a composition composed according to this invention with aqueous invert sugar has a pH of about 3.8.

Other applicable hydrophilic colloids are cellulose derivatives such as carboxyalkyl cellulose ethers, e.g. carboxymethylcellulose, carboxyethylcellulose, carboxypropyl cellulose; alkyl cellulose ethers, e.g. methyl cellulose; carboxyalkyl hydroxyalkyl cellulose ethers, e.g. carboxymethyl hydroxyethyl cellulose, carboxyethyl hydroxyethyl cellulose; hydroxyalkyl cellulose ethers, e.g. hydroxyethylcellulose, hydroxypropyl cellulose; carrageenin; algin, pectins in addition to the rapid set pectin (150 grade) mentioned above and other edible vegetable hydrophilic colloids.

Lecithin, polyoxyethylene sorbitan monostearate and polyoxyethylene sorbitan monolaurate are the only emulsifiers now known to be useful in the present invention. Although any commercially available source of lecithin can be used, "Centrophil S.P.," manufactured by the Central Soya Company, is preferred. It is believed "Centrophil S.P." contains a minimum of 60% phosphatides in a cottonseed oil and propylene glycol carrier.

If the percentage of gelling agent in the stabilizer suspension is raised above the hereinbefore stated limit, the stabliizer will either not be of fluid consistency or the amount of gelling agent in the finished peanut butter will be so high that the peanut butter will have a gummy texture. If the percentage of gelling agent is too low, its function will not be apparent.

The role of the emulsifier is not precisely known but it also complements the gelling agent in preventing the separation of components of the stabilizer. Raising the amount of emulsifier above the hereinbefore stated limit does not enhance the stability of the stabilizer suspension and lowering the amount of the emulsifier to an amount below the hereinbefore stated limit will eliminate its function.

The following examples are illustrative of the preferred embodiments of this invention and are not to be construed in any way as limiting the scope of the present invention:

*Example I*

A peanut butter stablizer suspension was prepared in the following manner: An aqueous invert sugar solution of concentration 73° Brix, viscosity of 500 centipoises at 71° F. and a water vapor pressure of less than 12 mm.

mercury at 80° F. and weighing 1125.92 gm. was heated to 140° F. in a jacketed Hobart mixer. 5.67 gms. of rapid set pectin (150 grade) was added and admixed; 544.80 gms. of pulverized salt and 3.0 gms. of lecithin (Centrophil S.P.) were added and admixed; and finally 726.40 gms. of finely divided rapeseed hardstock in the beta-prime crystalline phase and hydrogenated to a iodine value of 8 was added and admixed. All mixing was done in the jacketed Hobart mixer, C–100, at a speed setting of Number 1. The temperature was reduced to 85° F. while mixing was continued with cooling water flowing at the rate of 40 gallons per hour at 64° F. through the Hobart Jacket.

The above stabilizer had a fluid consistency over the normal range of temperatures encountered; namely, from 60° F. to 100° F. It was substantially stable against separation of components for an indefinite period of time (up to six months) and did not need to be stirred before use. When incorporated in peanut butter it stablized the peanut butter against oil separation and did not cause undesirable "browning" in the finished peanut butter product.

*Example II*

Polyoxyethylene sorbitan monostearate was substituted for the lecithin (Centrophil S.P.) in a stabilizer suspension prepared in the manner of Example I. Results similar to those in Example I were obtained.

*Example III*

An aqueous glycerin solution containing 75% by weight glycerin and of viscosity of about 100 centipoises at 71° F. was substituted for the aqueous invert sugar solution in a stabilizer suspension prepared in the manner of Example I. Results similar to Example I were obtained except that the stabilizer was substantially stable against separation of components for at least 4 hours.

*Example IV*

An aqueous corn syrup solution containing 70% corn syrup (American Maize Frodex, dextrose equivalent 42) and of viscosity 850 centipoises at 71° F. was substituted for the aqueous invert sugar solution in a stabilizer suspension prepared in the manner of Example I. However, before the addition of the pectin the pH was adjusted to 3.8 with citric acid and the final temperature of the stabilizer was reduced to 85° F. with stagnant ice water.

Results similar to Example I were obtained except that the stabilizer was substantially stable against separation of components for at least 4 hours.

In Example I similar results are obtained with polyoxyethylene sorbitan monolaurate employed as the emulsifier instead of lecithin (Centrophil S.P.).

Likewise, similar results are obtained when other high melting, normally solid glycerides in the beta-prime crystalline phase including those derived from cottonseed oil, palm oil, tallow and peanut oil are substituted for the rapeseed hardstock of Example I.

Likewise, results similar to those in Example III are obtained when aqueous surcrose, honey and sorbitol solutions are substituted for the glycerin solution of Example III.

The foregoing description has been presented describing certain operable and preferred embodiments of this invention. Other variations will be apparent to those skilled in the art.

What is claimed is:

1. A peanut butter stabilizer having a fluid consistency over the range of temperatures between about 60° F. and about 100° F., and substantially stable against separation of components for at least four hours comprising (1) from about 40% to about 55% by weight of an aqueous solution of a polyhydric alcohol selected from the group consisting of invert sugar, corn syrup, sucrose, glycerin, honey and sorbitol, the solution having a water vapor pressure no greater than about 20 mm. mercury at 80° F. and a viscosity ranging from about 50 centipoises to about 1000 centipoises at 71° F., (2) from about 0.1% to about 0.5% by weight of a hydrophilic colloid, (3) from about 0.05% to about 0.5% by weight of an emulsifier selected from the group consisting of lecithin, polyoxyethylene sorbitan monostearate, polyoxyethylene sorbitan monolaurate, and (4) from about 20% to about 60% by weight of finely divided, high melting normally solid glycerides in the beta-prime crystalline phase; and wherein the total solids content is from about 45% to about 60% of the weight of the stabilizer, said solids being in uniform suspension in said polyhydric alcohol solution.

2. The peanut butter stabilizer of claim 1 where the polyhydric alcohol is invert sugar.

3. The peanut butter stabilizer of claim 1 where the polyhydric alcohol is glycerin.

4. The peanut butter stabilizer of claim 1 where the polyhydric alcohol is corn syrup.

5. The peanut butter stabilizer of claim 1 where the glyceride is rapeseed oil hydrogenated to an iodine value not greater than about 10.

6. The peanut butter stabilizer of claim 1 where the glyceride is cottonseed oil hydrogenated to an iodine value not greater than about 10.

7. The peanut butter stabilizer of claim 2 where the emulsifier is lecithin (Centrophil S.P.).

8. The peanut butter stabilizer of claim 2 wherein the emulsifier is polyoxyethylene sorbitan monistearate.

9. The peanut butter stabilizer of claim 2 where the invert sugar solution has a water vapor pressure no greater than about 12 mm. mercury at 80° F.

10. The peanut butter stabilizer of claim 2 where the aqueous invert sugar solution has a viscosity of about 500 centipoises at 71° F.

11. The peanut butter stabilizer of claim 2 where the hydrophilic colloid is rapid set pectin, grade 150.

12. A peanut butter stabilizer which is of fluid consistency over the range of temperatures between about 60° F. and about 100° F., and stable against separation of components for up to six months comprising (1) from about 40% to about 55% by weight of an aqueous invert sugar solution of a concentration of about 73° Brix, (2) from about 0.1% to about 0.5% by weight of rapid set pectin, 150 grade, (3) from about 0.05% to about 0.5% by weight of lecithin (Centrophil S.P.), and (4) from about 20% to about 60% by weight of finely divided rapeseed oil hydrogenated to an iodine value not greater than about 10; and wherein the todal solids content is from about 45% to about 60% of the weight of the stabilizer, said solids being in uniform suspension in said aqueous invert sugar solution.

13. The peanut butter stabilizer of Claim 11 where the glyceride is finely divided cottonseed oil hydrogenated to an iodine value not greater than about 10.

14. A process of manufacturing peanut butter which comprises the steps of (1) admixing with peanut paste a peanut butter stabilizer having the composition of claim 1 and (2) processing the mass thus formed in a conventional manner including the steps of rapidly cooling said mass by passing it through a scrapped wall heat exchanger, and transferring it to a final marketing container.

No references cited.

A. LOUIS MONACELL, *Primary Examiner.*